(12) United States Patent
Cagnani et al.

(10) Patent No.: US 8,129,490 B2
(45) Date of Patent: Mar. 6, 2012

(54) SOFT PROPYLENE POLYMER COMPOSITIONS

(75) Inventors: Camillo Cagnani, Ferrara (IT); Enrico Beccarini, Ferrara (IT); Claudio Cavalieri, Ferrara (IT)

(73) Assignee: Basell Poliolefine Italia S.R.L., Milan (IT)

( * ) Notice: Subject to any disclaimer, the term of this patent is extended or adjusted under 35 U.S.C. 154(b) by 214 days.

(21) Appl. No.: 12/451,590

(22) PCT Filed: May 16, 2008

(86) PCT No.: PCT/EP2008/056042
§ 371 (c)(1),
(2), (4) Date: Nov. 20, 2009

(87) PCT Pub. No.: WO2008/142019
PCT Pub. Date: Nov. 27, 2008

(65) Prior Publication Data
US 2010/0130691 A1 May 27, 2010

Related U.S. Application Data

(60) Provisional application No. 60/931,341, filed on May 23, 2007.

(30) Foreign Application Priority Data

May 22, 2007 (EP) .................................. 07108603

(51) Int. Cl.
*C08F 210/00* (2006.01)
*C08F 2/34* (2006.01)
(52) U.S. Cl. ..................................................... 526/348
(58) Field of Classification Search .................. 526/348
See application file for complete search history.

(56) References Cited

U.S. PATENT DOCUMENTS

| | | | |
|---|---|---|---|
| 4,399,054 | A | 8/1983 | Ferraris et al. |
| 4,469,648 | A | 9/1984 | Ferraris et al. |
| 4,971,937 | A | 11/1990 | Albizzati et al. |
| 5,221,651 | A | 6/1993 | Sacchetti et al. |
| 5,698,642 | A | 12/1997 | Govoni et al. |
| 6,127,304 | A | 10/2000 | Sacchetti et al. |
| 6,323,152 | B1 | 11/2001 | Sacchetti et al. |
| 6,407,028 | B1 | 6/2002 | Sacchetti et al. |
| 6,413,477 | B1 | 7/2002 | Govoni et al. |
| 6,437,061 | B1 | 8/2002 | Sacchetti et al. |
| 6,686,307 | B2 | 2/2004 | Sacchetti et al. |
| 6,689,845 | B1 | 2/2004 | Govoni et al. |
| 6,818,187 | B2 | 11/2004 | Govoni et al. |
| 6,818,583 | B1 | 11/2004 | Morini et al. |
| 6,825,309 | B2 | 11/2004 | Morini et al. |
| 7,022,640 | B2 | 4/2006 | Morini et al. |
| 7,049,377 | B1 | 5/2006 | Morini et al. |
| 7,169,871 | B2 | 1/2007 | Morini et al. |
| 7,381,773 | B2 | 6/2008 | Pelliconi et al. |
| 2005/0032633 | A1 | 2/2005 | Morini et al. |
| 2008/0090982 | A1 | 4/2008 | Cagnani et al. |

FOREIGN PATENT DOCUMENTS

| | | |
|---|---|---|
| EP | 45977 | 2/1982 |
| EP | 361494 | 4/1990 |
| EP | 395083 | 10/1990 |
| EP | 728769 | 8/1996 |
| EP | 782587 | 7/1997 |
| EP | 1272533 | 1/2003 |
| WO | 98/44009 | 10/1998 |
| WO | 00/02929 | 1/2000 |
| WO | 00/63261 | 10/2000 |
| WO | 03/046021 | 6/2003 |
| WO | 2006/082144 | 8/2006 |
| WO | 2008/141934 | 11/2008 |

*Primary Examiner* — Nathan M Nutter
(74) *Attorney, Agent, or Firm* — William R. Reid; Dilworth IP LLC

(57) ABSTRACT

A propylene polymer composition having a Flexural modulus lower than 500 MPa, a total ethylene content from 9 to 30% by weight, a xylene soluble fraction at room temperature higher than 25% by weight, a melting temperature measured by DSC (Tm° C.) from 130 to 150° C. and a ratio between the weight of xylene soluble fraction at 25° C. and the hexane soluble fraction determined on plaque (100 μm) of higher than 4.

9 Claims, No Drawings

SOFT PROPYLENE POLYMER COMPOSITIONS

The present invention relates to soft propylene polymer compositions and to a process for their preparation. In particular, the said articles have good flexibility, excellent impact properties even at low temperature, and a very low release of chemical substances. Hence, the said articles are particularly suitable to be used for preparation of items to be in contact with food and also as PVC replacement in biomedical application (pouches, tubings). Specifically, the compositions as described hereinbelow are particularly suitable for the manufacture of extruded articles (films, tubes) and injection-moulded items.

It is well known from the prior art that a high xylene-soluble moiety is desirable for the production of soft copolymers. However, high values of the xylene-soluble moiety result in large quantities of the hexane extractables, so that the soft copolymer results unsuited in particular fields like food packaging. The European patent application WO03/046021 discloses thermoplastic polyolefin compositions having good impact properties at low temperature and also showing low hexane-extractable moiety. Said compositions comprise a propylene copolymer having xylene-insoluble fraction of not less than 85 wt % and a propylene copolymer with 8-40 wt % of alpha-olefin and have a Melt Flow Rate (MFR) determined according to ISO 1133 (230° C., 2.16 Kg of 3-30 g/10 min. The above-mentioned values of (MFR-L) are obtained by subjecting to peroxidic degradation a precursor composition having lower "MFR L" values.

The above mentioned compositions show a low content of hexane extractable fractions but are not entirely satisfactory in terms of softness (relatively high ratio flexural modulus/Melt flow rate) and impact properties at low and very low temperatures. On the other hand, it is possible to see that the hexane soluble fraction determined on plaque increases from 5.5% to 7.4% when the composition becomes softer (Flexural modulus of 370 MPa in ex. 3) and the total ethylene content increases (from 8% of Ex. 1 to 9.3% of Ex. 3). The said compositions are prepared by a sequential polymerization process comprising the preparation of component (A) in a first gas-phase polymerization apparatus comprising two interconnected polymerization zones and a second step (B) in which the propylene, ethylene reach, copolymer is prepared by polymerizing the monomers in a separate fluidized bed reactor.

The applicant has now found soft propylene polymer compositions having a still improved balance between hexane soluble moiety and low flexural modulus. Therefore, it is an object of the present invention a propylene polymer composition having a Flexural Modulus lower than 500 MPa, a total ethylene content from 9 to 30% b.w, a xylene soluble fraction at room temperature higher than 25%, a melting temperature measured by DSC (Tm° C.) from 130 to 150° C. and a ratio between the weight of xylene soluble fraction at 25° C. and the hexane soluble fraction determined on plaque of higher than 4; all the percentages by weight being referred to the total amount of the composition.

As mentioned above, the compositions prepared by the above process are characterized by a very low value of hexane extractable fraction even though they are extremely soft and the xylene soluble fraction is higher than 30% wt.

Preferably, the compositions prepared according to the process of the invention have a flexural modulus lower than 500 MPa, preferably lower than 450 MPa, most preferably lower than 400 MPa. The fraction soluble in xylene at room temperature is higher than 25% by weight, preferably higher than 30% and more preferably higher than 32% by weight.

The total ethylene content is higher than 9%, preferably higher than 10% and more preferably ranging, from 10 to 25% by weight.

The value of the intrinsic viscosity of the xylene soluble fraction determined on the reactor grade polymer composition gerically ranges from 0.5 dUg and 5.0 dUg, preferably from 1.0 to 4.0 dl/g and more preferably from 2.0 to 4.0 dl/g.

The Melting Temperature determined via DSC is preferably in the range 135-145° C.

The compositions obtained according to the process of the invention can be obtained as reactor grade with a Melt Flow Rate value according to ISO 1133 (230° C., 2.16 Kg) ranging from 0.1 to 50 g/10 min. Preferably, they are obtained with a MFR of less than 5 and more preferably in the range 0.5-4 g/10 min. Then, if desired they can be visbroken according to known technique in order to reach the final MFR value suited for the selected application. The chemical degradation of the polymer (visbreaking) is carried out in the presence of free radical initiators, such as peroxides. Examples of radical initiators that can be used for this purpose are 2,5-dimethyl-2,5-di(tert-butylperoxide)-hexane and dicumyl-peroxide. The degradation treatment is carried out by using the appropriate quantities of free radical initiators, and preferably takes place in an inert atmosphere, such as nitrogen. Methods, apparatus, and operating conditions known in the art can be used to carry out this process.

The MFR after visbreaking can be in the range from 2 to 40 and preferably from 4 to 30/10 min. The so obtained propylene copolymers are characterized by an excellent IZOD Impact Strength. The samples, when tested according to ISO 180/1 A result not to be broken at 23° C. When tested at 0° C. the impact strength ranges from 10 to 40 KJ/m$^2$ while at −20° C. it ranges from 5 to 10 KJ/m$^2$ thereby showing a high resistance even at low temperature. It is worth noting that softness and impact resistance are shown in the presence of very low hexane extractability which, determined on plaque, is lower than 8% and preferably lower than 7% by weight. When the hexane extractability is determined on film (100 μm) the value is even lower than 6% by weight.

Typically the weight ratio between the xylene-soluble moiety and the hexane-extractable moiety (determined on film) is more than 4 preferably more than 5 and more preferably more than 6 even in correspondence with an amount of xylene soluble fraction higher than 30% by weight and a total ethylene content of higher than 10%. This feature ensures the use of the soft compositions even in food contact or medical applications.

The propylene copolymer compositions can be produced with a process comprising at least one polymerization step carried out in a gas-phase polymerization reactor comprising at least two interconnected polymerization zones. It is also possible to prepare the propylene copolymer composition disclosed above in a sequential process in which at least one polymerization step is carried out in a gas-phase reactor comprising at least two interconnected polymerization zones and another polymerization step carried out in a conventional liquid polymerization reactor or conventional fluidized or stirred bed gas-phase reactor. Preferably, at least 30% by weight of said xylene soluble fraction is produced in a polymerization step carried out in a gas-phase polymerization reactor comprising at least two interconnected polymerization zones. Preferably, at least 50% and more preferably at least 70% by weight of said xylene soluble fraction is produced in a polymerization step carried out in a gas-phase polymerization reactor comprising at least two interconnected polymerization zones. In a very preferred embodiment, the whole composition is prepared by polymerization of monomer in a gas-phase reactor comprising at least two interconnected polymerization zones.

A polymerization process carried out in a gas-phase polymerization reactor comprising at least two interconnected polymerization zones is described in the European patent EP 782587.

The process is carried out in a first and in a second interconnected polymerization zone to which propylene and ethylene or propylene and alpha-olefins are fed in the presence of a catalyst system and from which the polymer produced is discharged. The growing polymer particles flow through the first of said polymerization zones (riser) under fast fluidization conditions, leave said first polymerization zone and enter the second of said polymerization zones (downcomer) through which they flow in a densified form under the action of gravity, leave said second polymerization zone and are reintroduced into said first polymerization zone, thus establishing a circulation of polymer between the two polymerization zones. Generally, the conditions of fast fluidization in the first polymerization zone is established by feeding the monomers gas mixture below the point of reintroduction of the growing polymer into said first polymerization zone. The velocity of the transport gas into the first polymerization zone is higher than the transport velocity under the operating conditions and is normally between 2 and 15 m/s. In the second polymerization zone, where the polymer flows in densified form under the action of gravity, high values of density of the solid are reached which approach the bulk density of the polymer; a positive gain in pressure can thus be obtained along the direction of flow, so that it becomes possible to reintroduce the polymer into the first reaction zone without the help of mechanical means. In this way, a "loop" circulation is set up, which is defined by the balance of pressures between the two polymerization zones and by the head loss introduced into the system. Optionally, one or more inert gases, such as nitrogen or an aliphatic hydrocarbon, are maintained in the polymerization zones, in such quantities that the sum of the partial pressures of the inert gases is preferably between 5 and 80% of the total pressure of the gases. The operating parameters such as, for example, the temperature are those that are usual in gas-phase olefin polymerization processes, for example between 50° C. and 120° C. The process can be carried out under operating pressure of between 0.5 and 10 MPa, preferably between 1.5 and 6 MPa. Preferably, the various catalyst components are fed to the first polymerization zone, at any point of said first polymerization zone. However, they can also be fed at any point of the second polymerization zone. Molecular weight regulators known in the art, particularly hydrogen, can be used to regulate the molecular weight of the growing polymer.

By the use of he means described in WO00/02929 it is possible to totally or partially prevent that the gas mixture present in the riser enters the downcomer; in particular, this is preferably obtained by introducing in the downer a gas and/or liquid mixture having a composition different from the gas mixture present in the riser. According to a particularly advantageous embodiment of the present invention, the introduction into the downcomer of the said gas and/or liquid mixture having a composition different from the gas mixture present in the riser is effective in preventing the latter mixture from entering the downcomer. Therefore, it is possible to obtain two interconnected polymerization zones having different monomer compositions and thus able to produce polymers with different properties.

The above feature is particularly important for producing the propylene copolymer of the invention, because it allows to maintain different amounts of ethylene in the two zones which, in turn permits to produce in the zone less reach in ethylene a substantial amount of the propylene copolymer fraction insoluble in xylene and in the zone more reach in ethylene a substantial amount of the propylene copolymer fraction soluble in xylene.

Typically, the polymerization zone more reach in ethylene is the riser where the molar concentration of ethylene (expressed as molar ratio between ethylene and the total molar amount of monomers), when the whole propylene copolymer composition is produced in the gas-phase polymerization reactor comprising the two interconnected polymerization zones, ranges from 0.1 to 0.3 and preferably from 0.12 to 0.20; in the downcomer, by virtue of the barrier effect provided by the gas and/or liquid feeding described above, the composition of the gas phase is less reach in ethylene and generally in the range of from 0.01-0.05 preferably from 0.02 to 0.04. The ratio between the ethylene content in the riser and that in the downcomer is typically higher than 5 and more typically higher than 6.

If an additional stage in a different type of reactor is performed, it is particularly preferred to carry out it in a conventional fluidized-bed gas-phase reactor. Preferably this stage is carried out as a second stage. The polymerization mixture is discharged from the downcomer to a gas-solid separator, and subsequently fed to the fluidized-bed gas-phase reactor operating under conventional conditions of temperature and pressure.

Each polymerization stage is carried out in presence of a highly stereospecific catalyst based on a transition metal compound. Preferably, it is an heterogeneous Ziegler-Natta catalyst. The Ziegler-Natta catalysts suitable for producing the propylene polymer compositions of the invention comprise a solid catalyst component comprising at least one titanium compound having at least one titanium-halogen bond and at least an electron-donor compound (internal donor), both supported on magnesium chloride. The Ziegler-Natta catalysts systems further comprise an organo-aluminum compound as essential co-catalyst and optionally an external electron-donor compound.

Suitable catalysts systems are described in the European patents EP45977, EP361494, EP728769, EP 1272533 and in the international patent application WO00/63261.

Preferably, the solid catalyst component comprises Mg, Ti, halogen and an electron donor selected from succinates of formula (I):

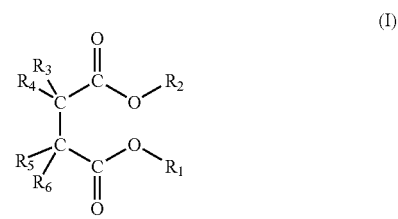

(I)

wherein the radicals $R_1$ and $R_2$, equal to or different from each other, arc a $C_1$-$C_{20}$ linear or branched alkyl, alkenyl, cycloalkyl, aryl, arylalkyl or alkylaryl group, optionally containing heteroatoms; the radicals $R_3$ to $R_6$ equal to or different from each other, arc hydrogen or a $C_1$-$C_{20}$ linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably $C_1$-$C_8$ alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (I) is that in which at least two radicals from $R_3$ to $R_6$ are different from hydrogen and are selected from $C_1$-$C_{20}$ linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred. A particularly preferred catalyst comprises in addition to Mg, Ti, and halogen an electron donor selected from esters of phthalic acids disclosed in EP45977 and in particular of either diisobutylphathalate or dihexylphthalate or diethylphthalate and mixtures thereof.

According to a preferred method, the solid catalyst component can be prepared by reacting a titanium compound of formula $Ti(OR)_{n-y}X_y$, where n is the valence of titanium and y is a number between 1 and n, preferably $TiCl_4$, with a magnesium chloride deriving from an adduct of formula $MgCl_2.pROH$, where p is a number between 0.1 and 6, preferably from 2 to 3.5, and R is a hydrocarbon radical having 1-18 carbon atoms. The adduct can be suitably prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Examples of spherical adducts prepared according to this procedure are described in U.S. Pat. No. 4,399,054 and U.S. Pat. No. 4,469,648. The so obtained adduct can be directly reacted with the Ti compound or it can be previously subjected to thermal controlled dealcoholation (80-130° C.) so as to obtain an adduct in which the number of moles of alcohol is generally lower than 3, preferably between 0.1 and 2.5. The reaction with the Ti compound can be carried out by suspending the adduct (dealcoholated or as such) in cold $TiCl_4$ (generally 0° C.); the mixture is heated up to 80-130° C. and kept at this temperature for 0.5-2 hours. The treatment with $TiCl_4$ can be carried out one or more times. The internal donor can be added during the treatment with $TiCl_4$ and the treatment with the electron donor compound can be repeated one or more times. Generally, the succinate of formula (I) is used in molar ratio with respect to the $MgCl_2$ of from 0.01 to 1 preferably from 0.05 to 0.5. The preparation of catalyst components in spherical form is described for example in European patent application EP-A-395083 and in the International patent application WO98/44001. The solid catalyst components obtained according to the above method show a surface area (by B.E.T. method) generally between 20 and 500 m²/g and preferably between 50 and 400 m²/g, and a total porosity (by B.E.T. method) higher than 0.2 cm³/g preferably between 0.2 and 0.6 cm³/g.

The porosity (Hg method) due to pores with radius up to 10.000Å generally ranges from 0.3 to 1.5 cm³/g, preferably from 0.45 to 1 cm³/g.

The organo-aluminum compound is preferably an alkyl-Al selected from the trialkyl aluminum compounds such as for example triethylaluminum, triisobutylaluminum, tri-n-butylaluminum, tri-n-hexylaluminum, tri-n-octylaluminum. It is also possible to use mixtures of trialkylaluminum's with alkylaluminum halides, alkylaluminum hydrides or alkylaluminum sesquichlorides such as $AlEt_2Cl$ and $Al_2Et_3Cl_3$.

Preferred external electron-donor compounds include silicon, compounds, ethers, esters such as ethyl 4-ethoxybenzoate, amines, heterocyclic compounds and particularly 2,2,6,6-tetramethyl piperidine, ketones and the 1,3-diethers. Another class of preferred external donor compounds is that of silicon compounds of formula $R_a^5R_b^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms. Particularly preferred are methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1, trifluoropropyl-metil-dimethoxysilane. The external electron donor compound is used in such an amount to give a molar ratio between the organo-aluminum compound and said electron donor compound of from 0.1 to 500.

The catalytic system can be pre-contacted (pre-polymerized) with small amounts of olefins. The molecular weight of the propylene polymer composition can be regulated by using known regulators, such as hydrogen.

The propylene copolymer compositions may then be added with additives commonly employed in the polyolefin field, such as antioxidants, light stabilizers, nucleating agents, antiacids, colorants and fillers. The main application of the propylene polymer compositions of the invention is the production of films, particularly soft blown films for food contact and biomedical application, extruded articles such as tubes and molded articles, particularly injection-molded items. The injection-molded articles comprising the propylene polymer compositions of the invention have good flexibility and excellent impact properties at low temperature. Due to the low hexane-extractable fraction of the polyolefin compositions of the invention the films and injection-molded articles obtained therefrom are particularly suitable for food applications. The following examples are given to illustrate and not to limit the present invention.

EXAMPLES

The data of the propylene polymer materials were obtained according to the following methods:

Xylene-Soluble Faction 2.5 g of polymer and 250 mL of o-xylene are introduced in a glass flask equipped with a refrigerator and a magnetical stirrer. The temperature is raised in 30 minutes up to the boiling pint of the solvent. The so obtained solution is then kept under reflux and stirring for further 30 minutes. The closed flask is then kept for 30 minutes in a bath of ice and water and in thermostatic water bath at 25° C. for 30 minutes as well. The solid thus obtained is filtered on quick filtering paper and the filtered liquid is divided into two 100 ml aliquots. One 100 ml aliquots of the filtered liquid is poured in a previously weighed aluminum container, which is heated on a heating plate under nitrogen flow, to remove the solvent by evaporation. The container is then kept on an oven at 80° C.

under vacuum until constant weight is obtained. The residue is weighed to determine the percentage of xylene-soluble polymer.

Comonomer (C2) Content

By IR spectroscopy.

The comonomer content of the Component B is determined on the precipitated "amorphous" fraction of the polymer. The precipitated "amorphous" fraction is obtained as follows: to one 100 ml aliquot of the filtered liquid obtained as described above 200 ml of acetone are added under vigorous stirring. Precipitation must be complete as evidenced by a clear solid-solution separation. The solid thus obtained is filtered on a tared metallic screen and dried in a vacuum oven at 70° C. until a constant weight is reached.

Molar Ratio of Feed Gasses

Determined by gas-chromatography

Melt Flow Rate (MFR)

Determined according to ISO 1133 (230° C., 2.16 Kg)

Intrinsic Viscosity

Determined in tetrahydronaphthalene at 135° C.

Flexural Modulus

Determined according to ISO 178

Stress at Yield and at Break

Determined according to ISO 527

Elongation at Yield and Break

Determined according to ISO 527

IZOD Impact Strength

Determined according to ISO 180/1 A

Ductile/Brittle Transition Temperature (D/B)

According to this method, the bi-axial impact resistance is determined through impact with an automatic, computerized striking hammer.

The circular test specimens are obtained by cutting with circular hand punch (38 mm diameter). They are conditioned for at least 12 hours at 23° C. and 50 RH and then placed in a thermostatic bath at testing temperature for 1 hour. The force-time curve is detected during impact of a striking hammer (5.3 kg, hemispheric punch with a ½" diameter) on a circular specimen resting on a ring support. The machine used is a CEAST 6758/000 type model no. 2.

D/B transition temperature is the temperature at which 50% of the samples undergoes fragile break when submitted to the above-mentioned impact test.

The plaques for D/B measurements, having dimensions of 127×127×1.5 mm are prepared according to the following method.

The injection press is a Negri Bossi™ type (NB 90) with a clamping force of 90 tons. The mould is a rectangular plaque (127×127×1.5 mm).

The main process parameters are reported below:

| Back pressure (bar): | 20 |
| Injection time (s): | 3 |
| Maximum Injection pressure (MPa): | 14 |
| Hydraulic injection pressure (MPa): | 6-3 |
| First holding hydraulic pressure (MPa): | 4 ± 2 |
| First holding time (s): | 3 |
| Second holding hydraulic pressure (MPa): | 3 ± 2 |
| Second holding time (s): | 7 |
| Cooling time (s): | 20 |
| Mould temperature (° C.): | 60 |
| The melt temperature is between 220 and 280° C. | |

Hexane Extractable

The hexane extractable fraction is determined according to modified FDA method (federal registration, title 21, Chapter 1, part 177, section 1520, s. Annex B) on polymer formed into 100 μm thick plaque or film. The plaque is prepared by compression molding, while the film is prepared by extrusion.

Melting Temperature, Melting Enthalpy and Crystallization Temperature

Determined by DSC with a temperature variation of 20° C. per minute

Examples 1-5

The Ziegler-Natta catalyst was prepared according to the Example 5, lines 48-55 of the European Patent EP728769. Triethylaluminium (TEAL) was used as co-catalyst and dicyclopentyldimethoxysilane as external donor, with the weight ratios indicated in Table 1.

The propylene copolymer compositions of the examples were prepared in a single gas-phase polymerization reactor comprising two interconnected polymerization zones, a riser and a downcomer, as described in the European Patent EP782587 and WO00/02929. Triethylaluminium (TEA1) was used as co-catalyst and dicyclopentyldimethoxysilane as external donor, with the weight ratios indicated in Table 1. The operative conditions are indicated in Table 1.

The polymer particles exiting from the polymerization step were subjected to a steam treatment to remove the unreacted monomers and dried.

The propylene polymer compositions were added with the additives indicated in Table 2 and extruded in a twin-screw extruder Berstorff (L/D=33) under the following operating conditions:

| Temperature of the feeding section: | 190-210° C. |
| Melt temperature: | 240° C. |
| Temperature of the die section: | 230° C. |
| Flow rate: | 16 Kg/h |
| Rotational speed: | 250 rpm |

The properties measured on the samples are collected in Table 2.

TABLE 1

| EXAMPLE | | 1 | 2 | 3 | 4 | 5 |
|---|---|---|---|---|---|---|
| TEA/Donor | g/g | 4 | 5 | 4 | 5 | 4.1 |
| TEA/Catalyst | g/g | 5.7 | 5 | 5 | 7.2 | 6.2 |
| Temperature | ° C. | 65 | 65 | 65 | 65 | 65 |
| Pressure | barg | 22 | 22 | 22 | 22 | 22 |
| H2/C3 Riser | mol/mol | 0.01 | 0.016 | 0.016 | 0.018 | 0.017 |
| H2/C3 Downcomer | | 0.002 | 0.004 | 0.004 | 0.003 | 0.003 |
| C2⁻/C2⁻ + C3⁻ Riser | mol/mol | 0.14 | 0.14 | 0.11 | 0.141 | 0.145 |
| | | 0.028 | 0.027 | 0.018 | 0.026 | 0.029 |
| Split Riser/Downcomer | Wt/wt | 30/70 | 35/65 | | 30/70 | 30/70 |
| MFR | g/10' | 0.2 | 0.43 | 0.41 | 0.66 | 0.68 |
| C2 total | wt % | 11 | 11.4 | 11.4 | 9.70 | 10.3 |
| X.S. | wt % | 34.7 | 36.9 | 35.7 | 33.7 | 36.6 |
| IV XS | dl/gr | 3.28 | 2.76 | 2.65 | 2.49 | 2.53 |

TABLE 2

| EXAMPLE | | 1 | 2 | 3 | 4 | 5 |
|---|---|---|---|---|---|---|
| Pellets formulation | | | | | | |
| A.O. B215 0 | wt % | 0.15 | 0.15 | 0.15 | 0.15 | 0.15 |
| Calcium Stearate | wt % | 0.05 | 0.05 | 0.05 | 0.05 | 0.05 |
| Luperox 101 | wt % | a.n | a.n | a.n | a.n | a.n |
| Characterization | | | | | | |
| Melt Flow Rate | | 8.1 | 5.3 | 11.6 | 6.5 | 5.5 |
| Flexural modulus | MPa | 260 | 260 | 304 | 293 | 300 |
| Stress at yield | MPa | 11.1 | 11 | 11.2 | 12.4 | 12.1– |
| Elongation at yield | % | 22.5 | 23 | 22 | 21.3 | 21.1 |
| Stress at break | MPa | –>9.9 | >20.3 | >22.9 | >21.7 | 19.6– |
| Elongation at break | % | >600 | >595 | >600 | >600 | 520 |
| IZOD 23° C. | kJ/m² | NB | NB | NB | NB | NB |
| IZOD 0° C. | kJ/m² | 34.7 | 32 | 14.5 | 13 | 14.2 |
| IZOD −20° C. | kJ/m² | 6.7 | 8.4 | 7.7 | 4 | 5.1 |
| D/B transition temperature | ° C. | 1.1 | | −41.4 | — | |
| Hexane extractable | | | | | | |
| on plaque | % | 5 | — | 6 | 5 | — |
| on film | | 4.5 | | 5 | 4 | |
| Melting | ° C. | 141 | 139 | 141 | 141 | 138 |
| Melting enthalpy | J/g | 50 | 45 | 53 | 50 | 46 |
| Crystallization temperature | ° C. | 90 | 88 | 91 | 88 | 90 |

A.O. B215 - 2:1 mixture of Irgafos 168 and Irganox 1010
CaSt Calcium stearate

The invention claimed is:

1. A propylene polymer composition having a Flexural modulus lower than 500 MPa, a total ethylene content from 9 to 30% by weight, a xylene soluble fraction at room temperature higher than 25% by weight, a melting temperature measured by DSC (Tm° C.) from 135 to 145° C., a ratio between the weight of xylene soluble fraction at 25° C. and the hexane soluble fraction determined on plaque (100 µm) of higher than 4, and an impact strength at −20° C. of 5 to 10 KJ/m$_2$.

2. The propylene polymer composition according to claim 1 in which xylene soluble fraction is higher than 30% wt.

3. The propylene polymer composition according to claim 1 in which the Flexural Modulus is lower than 450 MPa.

4. The propylene polymer composition according to claim 1 in which total ethylene content is higher than 10%.

5. The propylene polymer composition of claim 1 having hexane extractability determined on film (100 µm) of lower than 6% by weight.

6. The propylene polymer composition of claim 1 having hexane extractability determined on plaque of lower than 7% by weight.

7. The propylene polymer composition of claim 1 having an impact strength (0° C.) from 10 to 40 KJ/m$_2$.

8. The propylene polymer composition of claim 1 in which ratio between the weight of xylene soluble fraction at 25° C. and the hexane soluble fraction determined on plaque is higher than 5.

9. The propylene polymer composition of claim 1 wherein the intrinsic viscosity of the xylene soluble fraction is from 2.6 to 4 dl/g.

* * * * *